(No Model.)

A. K. HAWKES.
CASE FOR EYEGLASSES.

No. 305,185. Patented Sept. 16, 1884.

WITNESSES:
Jos. N. Rosenbaum.
Martin Petry.

INVENTOR
Albert K. Hawkes
BY Goepel & Raegener
ATTORNEYS.

UNITED STATES PATENT OFFICE.

ALBERT K. HAWKES, OF AUSTIN, TEXAS.

CASE FOR EYEGLASSES.

SPECIFICATION forming part of Letters Patent No. 305,185, dated September 16, 1884.

Application filed April 29, 1884. (No model.)

*To all whom it may concern:*

Be it known that I, ALBERT K. HAWKES, of Austin, in the county of Travis and State of Texas, have invented certain new and useful Improvements in Cases for Eyeglasses, of which the following is a specification.

This invention has reference to an improved case for eyeglasses, which is adapted to be attached to the vest, to facilitate the carrying about and using of the eyeglasses without folding them together; and the invention consists of a case for eyeglasses provided at the back with a pin or other device, for attaching the same to the vest or coat, said case being provided at the upper end with a retaining device that prevents the dropping of the eyeglasses from the case.

Figure 1:
Figure 2:
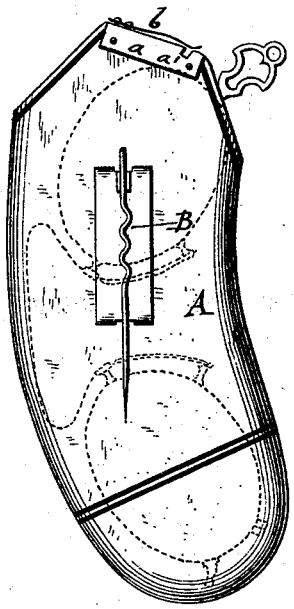
Figure 4:
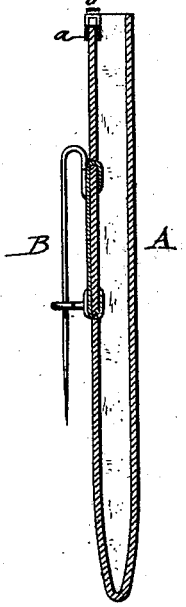
Figure 3:
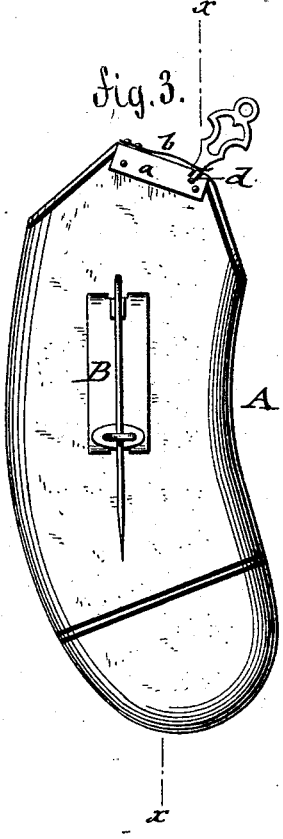

In the accompanying drawings, Figure 1 represents a perspective view of my improved case for eyeglasses, shown as attached to the vest. Figs. 2 and 3 are rear elevations of the same, showing different forms of attaching pins; and Fig. 4 is a vertical transverse section of the same on line $x\ x$, Fig. 3.

Similar letters of reference indicate corresponding parts.

A in the drawings represents a case for eyeglasses, and B a pin attached to the rear of the same, said pin being attached to the vest or coat, as deemed most convenient. The case A is made of such a size that the eyeglasses can be inserted therein without being closed or folded, whereby the nose-springs of the same are less exposed to wear than when they are worn in smaller cases, which requires them to be opened and closed. Besides, by the use of a large case, in which the glasses are stored away without folding, time is saved in putting on the glasses or replacing them in the case.

The shank of the pin B may either be corrugated, as shown in Fig. 2, or retained by a safety-hook. (Shown in Fig. 3.) In place of the pin any other equivalent fastening device may be used.

At the upper end of the case A is arranged a plate, $a$, having a recess, $a'$, and a spring, $b$, the free end of which extends over the recess $a'$. The spring $b$ serves to retain a sidewise-projecting stud, $d$, on the glasses in a recess, $a'$, of the case, so as to prevent thereby the glasses from dropping out of the case when the wearer bends over or stoops down.

Having thus described my invention, I claim as new and desire to secure by Letters Patent—

1. A case for eyeglasses, provided at its open end with means for retaining the stud of the glasses, substantially as set forth.

2. A case for eyeglasses, having a recessed edge plate at its upper end, and a spring attached to the said plate and extended over the recess, so as to retain the stud of the eyeglasses in the recess, to prevent the dropping of the glasses from the case when stooping down, substantially as set forth.

In testimony that I claim the foregoing as my invention I have signed my name in presence of two subscribing witnesses.

ALBERT K. HAWKES.

Witnesses:
A. W. BUNSEN,
W. O. SHUNDS.